United States Patent

Soubaras

(10) Patent No.: US 7,889,598 B2
(45) Date of Patent: Feb. 15, 2011

(54) METHOD OF SEISMIC PROCESSING FOR THE DECOMPOSITION OF A WAVEFIELD INTO HARMONIC COMPONENTS AND APPLICATIONS TO THE DETERMINATION OF ANGULAR GATHERS OF REFLECTIVITY

(75) Inventor: Robert Soubaras, Orsay (FR)

(73) Assignee: CGGVeritas Services SA, Massy (FR)

( * ) Notice: Subject to any disclaimer, the term of this patent is extended or adjusted under 35 U.S.C. 154(b) by 0 days.

(21) Appl. No.: 11/881,130

(22) Filed: Jul. 25, 2007

(65) Prior Publication Data

US 2008/0049552 A1    Feb. 28, 2008

Related U.S. Application Data

(62) Division of application No. 10/855,930, filed on May 27, 2004, now abandoned.

(30) Foreign Application Priority Data

May 27, 2003    (FR) .................................. 03 06451

(51) Int. Cl.
*G01V 1/00* (2006.01)
(52) U.S. Cl. ...................................... 367/43
(58) Field of Classification Search ................ 367/37, 367/38, 43, 44, 45, 46, 49; 702/16, 17
See application file for complete search history.

(56) References Cited

U.S. PATENT DOCUMENTS 4,780,859 A * 10/1988 Hadidi et al. ................. 367/43
6,131,071 A * 10/2000 Partyka et al. ................ 702/16

OTHER PUBLICATIONS

Sava, et al. "Angle-gathers by Fourier Transform." Stanford Exploration Project, Report 103, Apr. 27, 2000.*
Marfurt, et al. "Narrow-band spectral analysis and thin-bed tuning." Geophysics, vol. 66, No. 4 (Jul.-Aug. 2001).*
Sava, "Angle-gathers by Fourier Transform Transform." Stanford Exploration Project, report 103, Apr. 27, 2000.*

* cited by examiner

*Primary Examiner*—Jack Keith
*Assistant Examiner*—Krystine Breier
(74) *Attorney, Agent, or Firm*—Fulbright & Jaworski, L.L.P.

(57) ABSTRACT

Method of processing seismic data representative of at least one wavefield, characterized in that local harmonic components of the wavefield are determined at a given point P of the subsurface by implementing a recurrent processing according to which a harmonic of rank n+1, n being a positive integer, is determined as a function of one or more harmonics of rank n or lower to which is applied at least one filtering which depends on at least one local parameter at the point P, this local parameter being chosen from among the components of the wavevector, the frequency of the wavefield, the local velocity, the local anisotropy parameters or any combination of these various parameters.

11 Claims, 4 Drawing Sheets

Figure 1:
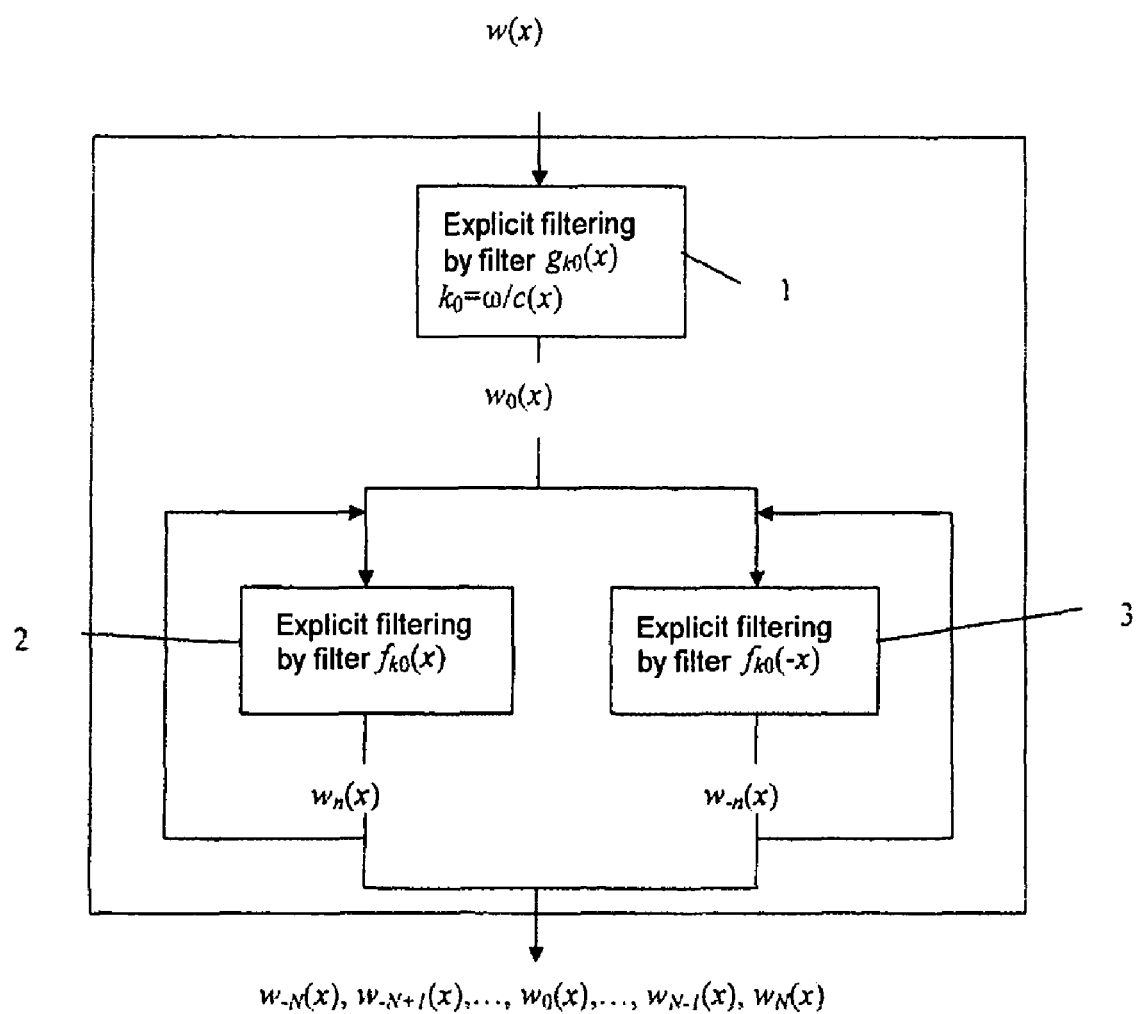

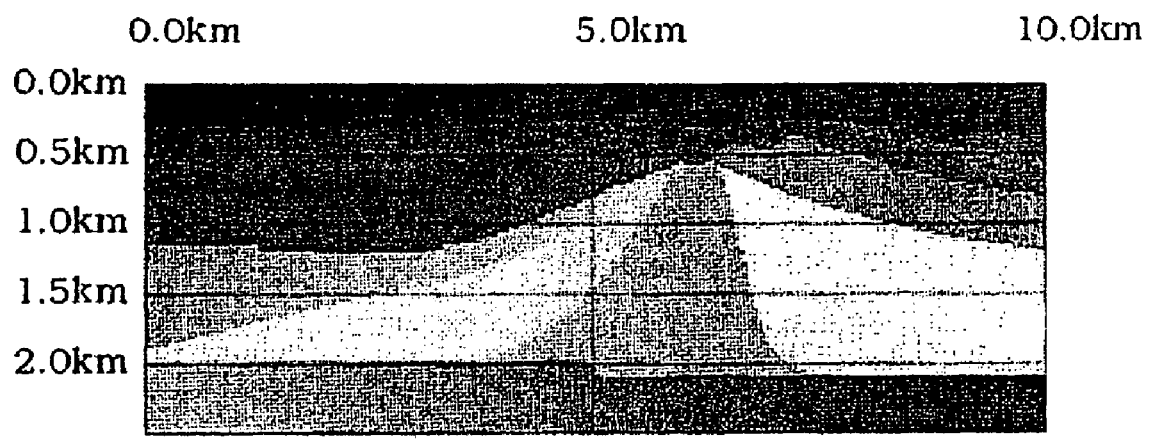
Figure 3: Velocity model
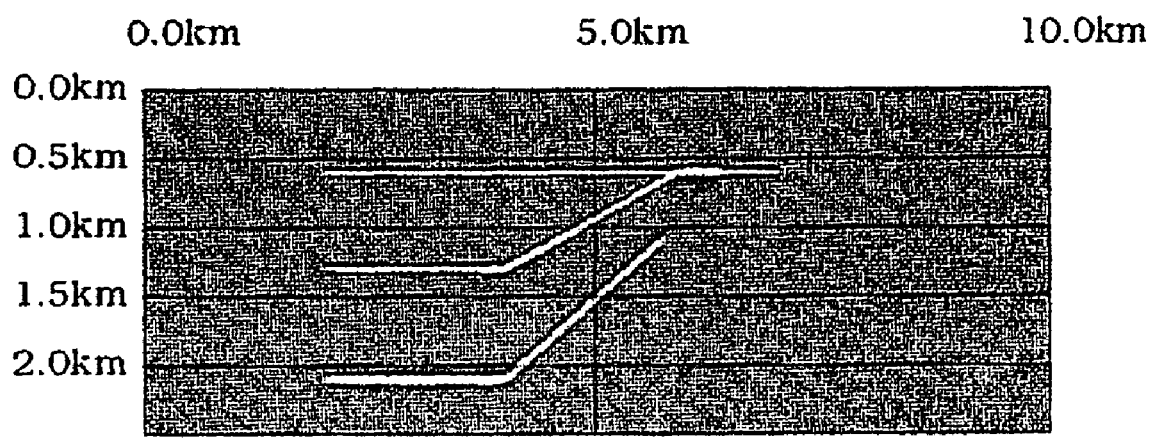
Figure 4: Migration

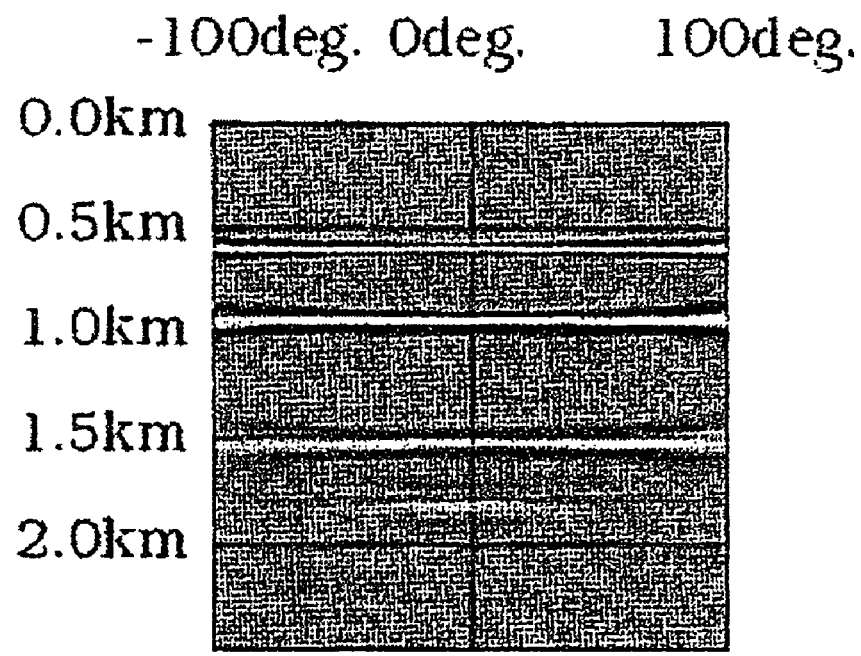
Figure 5: Angle gather (velocity)
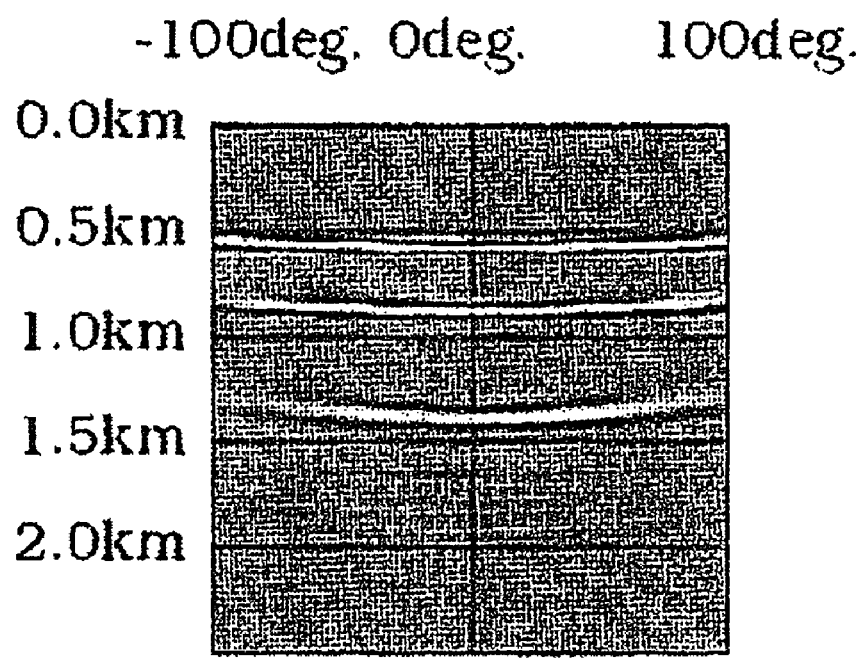
Figure 6 Angle gather (velocity 96%)

METHOD OF SEISMIC PROCESSING FOR THE DECOMPOSITION OF A WAVEFIELD INTO HARMONIC COMPONENTS AND APPLICATIONS TO THE DETERMINATION OF ANGULAR GATHERS OF REFLECTIVITY

CROSS-REFERENCE TO RELATED APPLICATION

This application is a divisional application based on U.S. Ser. No. 10/855,930 filed on May 27, 2004 now abandoned entitled "Method for Seismic Processing for the Decomposition of a Wavefield into Harmonic Components and Applications to the Determination of angular Gathers of Reflectivity".

The present invention relates to a method of seismic processing for the decomposition of a wavefield into various harmonic components.

It also proposes a method for the determination of angle reflectivity gathers.

GENERAL FIELD

Prestack depth migration is a central step in seismic processing. It consists in focusing the seismic events recorded time-wise, as reflections indexed depth-wise. One of the most accurate ways of performing this step is migration by shot-point, which consists in numerically propagating an incident wave representing the seismic source and a reflected wave. The incident wave is initialized surface-wise at the depth z=0 with a synthetic representation of the source and the reflected wave is so initialized with the wave recorded by the seismic sensors. Numerical propagation propagates these waves gradually across layers of thickness $\Delta z$. The output of the migration is a depth-dependent reflectivity computed on the basis of the cross-correlation of the incident and reflected waves and normalized on the basis of the autocorrelation of the incident wave. $i(x, z, f, m)$ representing the incident wave and $s(x, z, f, m)$ the reflected wave, for a given frequency $f$ and a given shot $m$.

This reflectivity is a scalar which satisfies the condition:

$$r(x, z) = \sum_{f,m} \overline{i(x, z, f, m)} s(x, z, f, m)$$

and is obtained by summing over all the frequencies and all the shots the cross-correlation of the incident wave and the reflected wave.

The representation of reflectivity by a scalar alone is however a drawback. It turns out in fact to be desirable to have a reflectivity dependent on the opening angle (difference between the angle of incidence and the angle of reflection). This angle-dependent reflectivity makes it possible to compute, for each horizontal position x, an angle gather which takes the form of an amplitude dependent on the depth z and angle $\theta$ variables.

This allows on the one hand AVA (amplitude versus angle) analyses, in which the amplitude variation of the reflection coefficient as a function of the opening angle makes it possible to characterize the local medium; this also makes it possible on the other hand to carry out velocity analyses by verifying that the seismic arrivals do not have angle-dependent arrival times. Processing can also be carried out to attenuate the multiple arrivals by rejecting events exhibiting a curvature in the depth-angle plane of the angle gather.

CURRENT STATE OF THE ART

Rickett and Sava (2001) have set forth a procedure for computing angle gathers. This procedure computes the cross-correlations for horizontal relative displacements between the incident and reflected wave:

$$r(x, z, h) = \sum_{f,m} \overline{i(x+h, z, f, m)} s(x-h, z, f, m)$$

After Fourier transform on the z and h variables, we obtain $R(x, k_z, k_h)$, then:

$$r(x, k_z, \theta) = R(x, k_z, k_z \tan \theta)$$

the angle gather $r(x, z, \theta)$ being obtained by inverse Fourier transform on the variable z. According to the conclusions of the authors, this procedure would exhibit troublesome artefacts in the case where the distance between the summed sources is not small, this being the case in practice.

Xie and Wu (2002) describe a procedure that does not seem to produce artefacts. This procedure is based on the transformation:

$$W(x, \theta) = \int_{-L}^{L} f(u) e^{j\frac{\omega}{c} \sin\theta u} w(x-u) du$$

where f(u) is an apodization window. Once this transformation has been performed on $i(x,z,f,m)$ and $s(x,z,f,m)$, we obtain:

$$r(x, z, \theta) = \sum_{f,m} \sum_{\theta_1} I(x, \theta_1 - \theta, z, f, m) S(x, \theta_1, z, f, m)$$

This procedure is expensive in terms of computation time being based as it is on a local transformation performed at each point and on the computation of a matrix.

General Presentation of the Invention

The invention proposes a seismic processing technique making it possible to perform the decomposition of a wavefield into various harmonic components.

It also proposes a technique allowing the determination of angle gathers of reflectivity coefficients.

More precisely, the invention proposes a method of processing seismic data representative of at least one wavefield, characterized in that local harmonic components of the wavefield are determined at a given point P of the subsurface by implementing a recurrent processing according to which a harmonic of rank n+1, n being a positive integer, is determined as a function of one or more harmonics of rank n or lower to which is applied at least one filtering which depends on at least one local parameter at the point P, this local parameter being chosen from among the components of the wavevector, the frequency of the wavefield, the local velocity, the local anisotropy parameters or any combination of these various parameters.

Advantageously also, a harmonic of rank n-1, n being a negative integer, is determined as a function of one or more harmonics of rank n or higher to which is applied at least one filtering which depends on at least one local parameter of the subsurface, this local parameter being chosen from among the components of the wavevector, the frequency of the wavefield, the local velocity, the local anisotropy parameters or any combination of these various parameters.

The invention also proposes a method of the aforesaid type in which the harmonics are determined through the recurrence:

$$\hat{w}_{n+1}(P) = h_{k_0(P)}^+(P) * \hat{w}_n(P)$$

for n a positive integer and $$\hat{w}_{n-1}(P) = h_{k_0(P)}^-(P) * \hat{w}_n(P)$$

for n a negative integer where the operation * designates a filtering, or any linear combination implementing the points neighbouring the point P, and where $h^+_{k_0}$ (P) is a filter corresponding to a filtering as a function of the wavenumber vector k such that:

$$H_{k_o}^+(k) = e^{-j\theta(k)}$$

and where $h^-_{k_0}$ (P) is a filter corresponding to a filtering as a function of the wavenumber vector k such that:

$$H_{k_0}^-(k) = \overline{H_{k_0}^+(k)} = e^{j\theta(k)}$$

$\theta(k)$ being an angular parameter dependent on at least one component of the wavenumber vector and on $k_o = \omega/c$ with $\omega = 2\pi f$, f designating the frequency of the wavefield, c its local velocity, the initial component $\hat{w}_0(P)$) being equal to the transform in the frequency domain of the wavefield at the point P or being a function thereof.

The invention furthermore proposes a method of processing seismic data according to which angular components of a wavefield w(P), where P designates a given point of the subsurface, are determined in the frequency domain, characterized in that harmonic components wn(P) of this wavefield are determined by and its angular components are reconstructed as a function of an angle $\theta$ which depends physically on a local parameter chosen from among the components of the wavevector, the frequency of the wavefield, the local velocity, the local anisotropy parameters or any combination of these various parameters, by determining $$W(x, \theta) = \sum_{n=-\infty}^{+\infty} \hat{w}_n(x) e^{jn\theta}$$

The method can be generalized by decomposing the angular components $W(x,\theta)$ into:

$$W(x, \theta) = \sum_{n=-\infty}^{+\infty} \hat{w}_n(x) B_n(\theta)$$

where the function $B_n(\theta)$ satisfies a recurrence relation, which may be of order higher than 1, for example:

$$B_{n+1}(\theta) = F(\theta) B_n(\theta) + G(\theta) B_{n-1}(\theta)$$

The $B_n(\theta)$ may not be orthogonal over the interval ($\theta_{min}$, $\theta_{max}$) considered, and in this case it is necessary to compute the matrix:

$$r_{mn} = \int_{\theta_{min}}^{\theta_{max}} \overline{B_m(\theta)} B_n(\theta) d\theta$$

The components $w_n(x)$ are obtained by inverting a linear system whose matrix is $\{r_{mn}\}$ and whose right-hand side is formed of components $w_n(P)$ obtained through a recurrence relation:

$$\hat{w}_{n+1}(P) = h_{k_0(P)}(P) * \hat{w}_n(P) + q_{k_0(P)}(P) * \hat{w}_{n-1}(P)$$

where the filters h and q are expressed in terms of wavenumber k with the aid of the relation $\theta_{k0}(k)$ expressing the angle as a function of wavenumbers and of the parameter $k0 = \omega/c(P)$ where c(P) is the local velocity:

$$H_{k_0}(k) = F(\theta_{k0}(k)), Q(k) = G(\theta_{k0}(k))$$

More generally, the filters involved in a recurrence relation are filters dependent on the physics of propagation in the subsurface and in particular on one or more parameters chosen from among the components of the wavevector, the frequency of the wavefield, the local velocity, the local anisotropy parameters or any combination of these various parameters.

Also, the invention proposes a method of processing seismic data according to which incident waves and reflected waves are processed at various points on the surface of the ground so as to determine an angle reflectivity gather, characterized by the steps according to which:
  for the various points considered, as well as for the various frequencies and the various shots, a local harmonic decomposition of the incident wave and/or a local harmonic decomposition of the reflected wave is/are computed,
  a local harmonic decomposition of the reflectivity is deduced therefrom for the various points considered and is summed frequency-wise and shot-wise,
  an angle gather of the reflectivity is deduced from the harmonic decomposition thus obtained after summation.

PRESENTATION OF THE FIGURES

Figure 2:
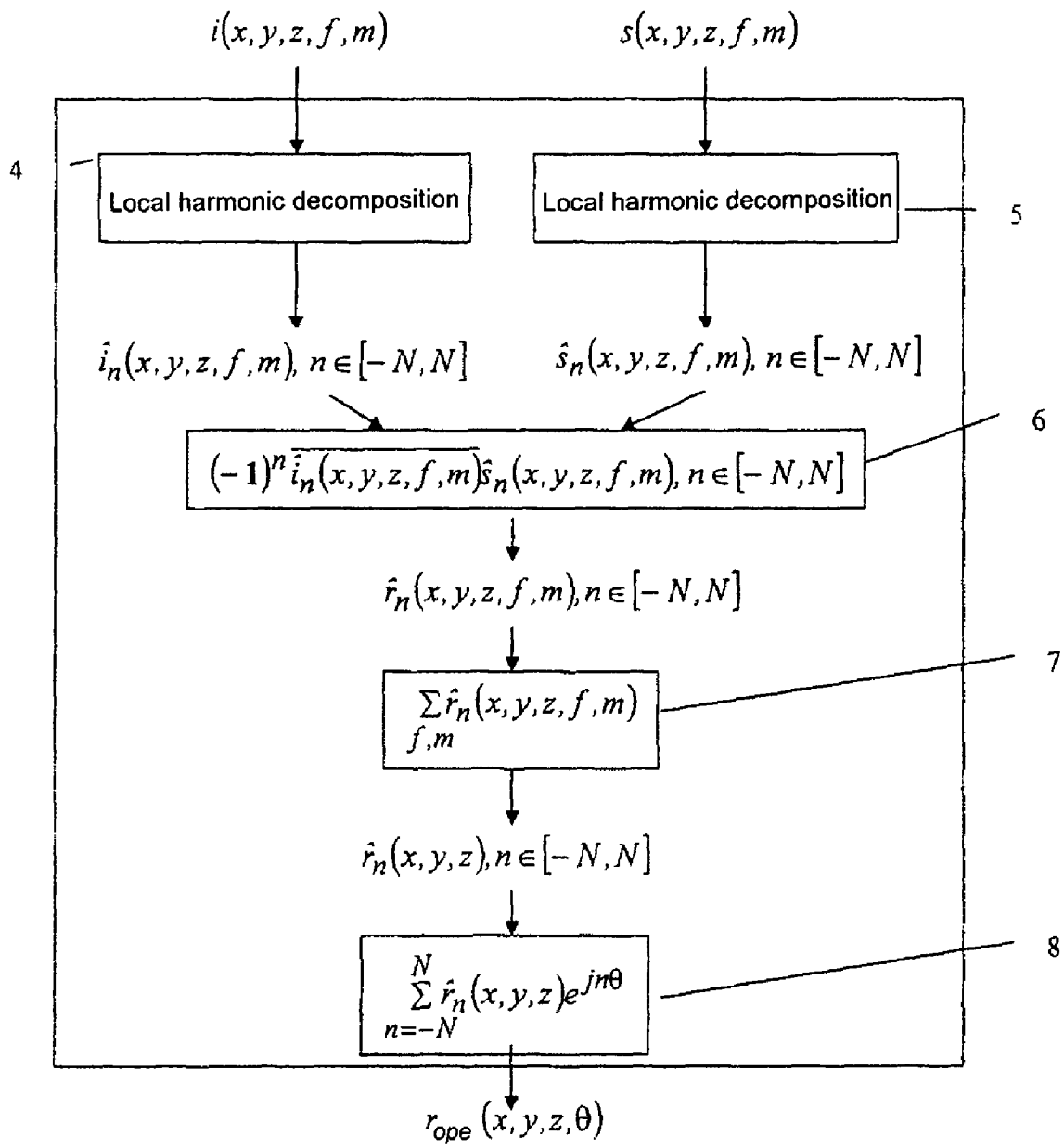

The description which follows is purely illustrative and nonlimiting and should be read in conjunction with the appended drawings in which:
  FIG. 1 illustrates an exemplary implementation of processing for determining harmonics;
  FIG. 2 illustrates various steps of an exemplary computation of angular gathers;
  FIG. 3 illustrates a velocity model used for a data set;
  FIG. 4 illustrates migration with the exact velocity model;
  FIG. 5 illustrates the angle gather obtained with the exact velocity model;
  FIG. 6 illustrates the angle gather which is obtained with too slow a velocity.

DESCRIPTION OF ONE OR MORE MODES OF IMPLEMENTATION OR EMBODIMENT

Theoretical Elements
  Let w(x) be a seismic wavefield at a frequency f and a depth z. We shall use the wavenumber $\omega = 2\pi f$ instead of the frequency f. We wish to decompose this wavefield as the sum of angle components. In general, this wavefield w(x) is the sum of its downgoing component $w_+(x)$ and of its upgoing component $w_-(x)$. We define the angle $\theta$ such that $\theta=0$ corresponds to a downward vertical propagation. $\theta$ is defined over $[-\pi/2,\pi/2]$ for the downgoing wave ($\cos\theta\geq 0$), and over $[\pi/2, 3\pi/2]$ for the upgoing wave ($\cos\theta<0$).

Let us consider the downgoing wave to begin with. We can take the Fourier transform:

$$w_+(x) = \frac{1}{2\pi}\int_{-\frac{\omega}{c}}^{\frac{\omega}{c}} e^{jkx}\hat{W}_+(k)dk \qquad (1)$$

where c is the local velocity. The evanescent energy corresponds to $|k|>\omega/c$. We define the angle through the change of variable:

$$k = \frac{\omega}{c}\sin\theta \qquad (2)$$

$$w_+(x) = \frac{1}{2\pi}\int_{-\pi/2}^{\pi/2} e^{j\frac{\omega}{c}\sin\theta x}\frac{\omega}{c}\cos\theta\hat{W}_+\left(\frac{\omega}{c}\sin\theta\right)d\theta \qquad (3)$$

We define an angle transform $W_+(\theta)$ as being zero over $\theta\in[\pi/2,3\pi/2]$ and defined over $\theta\in[-\pi/2,\pi/2]$ by:

$$W_+(\theta) = \frac{\omega}{c}\cos\theta\hat{W}_+\left(\frac{\omega}{c}\sin\theta\right) = \frac{\omega}{c}\cos\theta\int_{-\infty}^{\infty} e^{-j\frac{\omega}{c}\sin\theta x}w_+(x)dx \qquad (4)$$

With this definition, $w_+(x)$ can be decomposed as:

$$w_+(x) = \frac{1}{2\pi}\int_{-\pi/2}^{\pi/2} e^{j\frac{\omega}{c}\sin\theta x}W_+(\theta)d\theta \qquad (5)$$

We define a local angle transform by changing equation (4) into:

$$W_+(x,\theta) = \frac{\omega}{c}\cos\theta\int_{-\infty}^{\infty} e^{j\frac{\omega}{c}\sin\theta u}w_+(x-u)du \qquad (6)$$

This equation differs from that of Xie and Wu (2002) through the cosine term. This term is important since it ensures that the average of the angular components $W_+(x,\theta)$ gives the field $w_+(x)$.

$$w_+(x) = \frac{1}{2\pi}\int_{-\pi/2}^{\pi/2} W_+(x,\theta)d\theta$$

The procedure described also differs from that of Xie and Wu because the computation of the angle transform does not require any local transform.

Accordingly, starting from equation (6) we can, for each x, perform the Fourier transform on the angular variable. Since the latter is periodic with period $2\pi$, this corresponds to a decomposition into harmonics:

$$W_+(x,\theta) = \sum_{n=-\infty}^{+\infty} \hat{w}_n^+(x)e^{jn\theta} \qquad (7)$$

It will be noted that a characteristic of the technique proposed is that the harmonics $w_n^+(x)$ may be computed directly from the field $w^+(x)$, without any intermediate computation of $W_+(x,\theta)$. Since $W_+(x,\theta)$ is zero over $[\pi/2,3\pi/2]$:

$$\hat{w}_n^+(x) = \frac{1}{2\pi}\int_{-\pi/2}^{\pi/2} e^{-jn\theta}W_+(x,\theta)d\theta \qquad (8)$$

Inserting equation (6):

$$\hat{w}_n^+(x) = \frac{1}{2\pi}\int_{-\pi/2}^{\pi/2} e^{-jn\theta}\frac{\omega}{c}\cos\theta\int_{-\infty}^{\infty} e^{j\frac{\omega}{c}\sin\theta u}w_+(x-u)du\,d\theta \qquad (9)$$

exchanging the order of the integrals and making the change of variable $k=\omega/c\sin\theta$, we obtain:

$$\hat{w}_n^+(x) = \int_{-\infty}^{\infty} w_+(x-u)du\frac{1}{2\pi}\int_{-\pi/2}^{\pi/2} e^{-jn\theta}\frac{\omega}{c}\cos\theta e^{j\frac{\omega}{c}\sin\theta u}d\theta \qquad (10)$$

$$\hat{w}_n^+(x) = \int_{-\infty}^{\infty} w_+(x-u)du\int_{-\omega/c}^{\omega/c} e^{-jn\arcsin\frac{ck}{\omega}}e^{jku}dk \qquad (11)$$

Let us define in the k domain the filters:

$$F_n^+(k) = e^{-jn\arcsin\frac{ck}{\omega}} = \left(\sqrt{1-(ck/\omega)^2} - jck/\omega\right)^n \qquad (12)$$

we obtain, $f_n^+(x)$ being the corresponding filters in the x domain:

$$\hat{w}_n^+(x) = \int_{-\infty}^{\infty} f_n^+(u)w_+(x-u)du \qquad (13)$$

We see that we can compute $w_n^+(x)$ by filtering $w^+(x)$ with the filters $f_n^+(x)$, which, by using equation (2), may be written symbolically $F_n^+(k)=e^{-jn\theta}$.

These filters may be defined through the recursion:

$$F_0^+(k) = 1 \qquad (14)$$
$$F_{n+1}^+(k) = H_{k_0}^+(k)F_n^+(k), n \geq 0$$
$$F_{n-1}^+(k) = \overline{H_{k_0}^+(k)}F_n^+(k), n \leq 0$$

where the filter $H_{k_0}^+(k)=e^{-j\theta}$, which depends on $k_0=\omega/c$, is:

$$H_{k_0}^+(k)=\sqrt{1-(k/k_0)^2}-jk/k_0 \qquad (15)$$

The local harmonic decomposition may therefore advantageously be computed through:

$$w_0^+(x)=w_+(x)$$
$$w_{n+1}^+(x)=h_{k_0(x)}^+(x)*w_n^+(x), n\geq 0$$
$$w_{n-1}^+(x)=h_{k_0(x)}^+(-x)*w_n^+(x), n\leq 0 \qquad (16)$$

This can be generalized to a wave comprising an upgoing part, $w(x)=w_+(x)+w_-(x)$, the local harmonic decomposition becoming:

$$\hat{w}_n(x) = \int_{-\infty}^{\infty} f_n^+(u) w_+(x-u) du + \int_{-\infty}^{\infty} f_n^-(u) w_-(x-u) du \quad (17)$$

where the $f_n^-(x)$ are defined as previously except for the sign of the square root, which is the sign of $\cos\theta$, and which is negative instead of positive. We therefore have:

$$H_{k_0}^-(k) = -\sqrt{1-(k/k_0)^2} - jk/k_0 = -\overline{H_{k_0}^+(k)}$$

We can compute the local harmonic decomposition of the angle transformation:

$$W_+(x,\theta) = \int_{-\infty}^{\infty} e^{j\frac{\omega}{c}\sin\theta u} w_+(x-u) du$$

through a recursion of the same type as (16) but where the initialization is replaced by:

$$w_0^+(x) = g_{k_0(x)}(x) * w_+(x)$$

where $g_{k0}(x)$ is a spatial filter synthesizing the k-spectrum:

$$G_{k_0}(k) = \frac{1}{k_0\sqrt{1-(k/k_0)^2}}$$

Exemplary Implementation of the Invention

The above derivation shows that the local harmonic decomposition of a wavefield can be computed directly through a recursive filtering of the data by the local velocity-dependent filter given by equation (14). This derivation may be extended to a velocity field with lateral variation by using a so-called explicit filtering structure. In such a structure, the filters $h_{k0}(x)$ are tabulated beforehand for the useful values of $k_0$, that is to say the interval $[\omega_{min}/c_{max}, \omega_{max}/c_{min}]$, since at the point x, we use the coefficients of the filter corresponding to $k_0=\omega/c(x)$. Each of these filters must be accurate for the values $|k|\leq k_0 \sin\theta_{max}$, where $\theta_{max}$ is the maximum propagation angle and $|k|\leq \alpha k_{Nyq}$, where $\alpha$ is the proportion of the spatial Nyquist band preserved and $k_{Nyq}$ the Nyquist spatial frequency. The modulus of these filters must also be less than 1 everywhere for stability reasons. These filters can be non-recursive finite impulse response (FIR filters) or be infinite response filters applied in a recursive way (IIR filters).

The local harmonic decomposition is therefore computed through an explicit recursive filtering structure, of the type $w_{n+1}^+(x) = h_{k0(x)}(x) * w_n^+(x)$ initialized with $w_0^+(x) = w_+(x)$.

As illustrated in FIG. 1, the initial component may also be:

$$w_0(P) = g_{k_0(P)}(P) * w(P)$$

where $g_{k0}(P)$ is a spatial filter synthesizing the k-spectrum:

$$G_{k_0}(k) = \frac{1}{k_0\sqrt{1-(k/k_0)^2}}$$

k here designating the wavevector, or a component of the latter or else a parameter dependent on the latter.

Once this initial component has been determined through a first explicit filtering step (step 1 of FIG. 1), the recurrence processing for the positive integers (step 2) and the recurrence processing for the negative integers (step 3) are implemented in parallel.

As output we obtain the various harmonics $w_N$

Application to the Computation of Angular Gathers in Shot-point-based Migration

The harmonic decomposition method described above makes it possible to compute in an advantageous manner various angle gathers in the course of a shotpoint-based migration. For a given shot s, a frequency f and a depth z, the incident wavefield is i(x) and the reflected wavefield is s(x). We shall consider the local angle transformations $I(x,\theta)$ and $S(x,\theta)$ of i(x) and s(x). The angle-wise reflectivity $R(x,\theta)$ connects $I(x,\theta)$ to $S(x,\theta)$ by:

$$S(x,\theta_2) = \frac{1}{2\pi} \int_{-\pi/2}^{3\pi/2} R(x, \pi - \theta_1 + \theta_2) I(x, \theta_1) d\theta_1 \quad (18)$$

$$= \frac{1}{2\pi} \int_{-\pi/2}^{3\pi/2} G(x, \theta_2 - \theta_1) I(x, \theta_1) d\theta_1$$

by putting $G(x,\Delta\theta) = R(x, \pi - \Delta\theta)$.

Equation (18) is, for any x, an angle-wise convolution. If we perform a Fourier transform on the angular variable, and if we introduce the local harmonic decomposition, it simplifies into:

$$\hat{s}_n(x) = \hat{g}_n(x)\hat{i}_n(x) \quad (19)$$

If we consider only the kinematics, an angle gather may be computed by:

$$\hat{g}_n(x) = \overline{\hat{i}_n(x)} \hat{s}_n(x) \quad (20)$$

Hence the local harmonic decomposition of the reflectivity can be computed through the relation:

$$\hat{r}_n(x) = (-1)^n \overline{\hat{i}_n(x)} \hat{s}_n(x) \quad (21)$$

where $i_n(x)$ and $s_n(x)$ are the local harmonic decompositions of i(x) and s(x).

Thus, as illustrated in FIG. 2, after computing the local harmonics of the incident (step 4) and reflected (step 5) waves, we compute the various harmonics of reflectivity $r_n(x, z, f, m)$ for $n=[-N,N]$ for each depth z, frequency f and shot m (step 6) and we sum them over all the frequencies and shots (step 7):

$$\hat{r}_n(x,z) = (-1)^n \sum_{f,m} \overline{\hat{i}_n(x,z,f,m)} \hat{s}_n(x,z,f,m)$$

The angle gather $r(x,z,\theta)$ can then be reconstructed (step 8) from the harmonics $r_n(x,z)$ by:

$$r(x,z,\theta) = \sum_{n=-N}^{n=N} \hat{r}_n(x,z) e^{jn\theta}$$

However, the harmonics $r_n(x,z)$ are in themselves data that can be used in the seismic processing. In particular, a criterion of exactness of the velocity model is thus available: in the case where the velocity model used to migrate the data is exact, the (x,z)-wise images provided by the various harmonics should be superimposable.

Equation (21) may be considered to be a harmonic imaging condition generalizing the conventional scalar imaging condition $$r(x) = \overline{i(x)}s(x) \qquad (22)$$

An important property of the angle gather r(x,z,θ) obtained by this procedure is that its θ-wise average gives the conventional imaging condition $\overline{i(x)}s(x)$. Specifically, the average is the zero harmonic and $\hat{r}_0(x) = \overline{\hat{i}_0(x)}\hat{s}_0(x) = \overline{i(x)}s(x)$.

Comments Relating to The Illustration Given by FIG. 3 et Seq.

The figures are 2D synthetic data sets illustrating implementations. 100 shots spaced 100 m apart were generated on the basis of linear reflectors of varied dips and of the velocity model of FIG. 3. FIG. 4 shows the migration with the exact velocity model. FIG. 5 shows the angle gather for the horizontal coordinate 5 km with the exact velocity model. The exactness of the velocity model can be verified over all the events. FIG. 6 shows the same angle gather when the migration is made with too slow a velocity by 4%. The curvature of the events confirms that the velocity is too slow. All the events in the angular gather are centred on 0 degrees and independently of their own dip, as is desirable. The absence of artefacts can also be verified.

Other Types of Angle Gathers

The angle gather described previously is the gather in terms of opening angle. Other gathers may be computed on the basis of local harmonic decompositions of the incident and/or reflected wavefield.

The gather in terms of opening angle is obtained through:

$$r_{ope}(x, z, \theta) = \sum_{n=-N}^{N} (-1)^n e^{jn\theta} \sum_{f,m} \overline{\hat{i}_n(x, z, f, m)} \hat{s}_n(x, z, f, m)$$

An angle gather which indicates the local dip of the reflector is obtained through:

$$r_{dip}(x, z, \theta) = \sum_{n=-N}^{N} (-1)^n e^{jn\theta} \sum_{f,m} \hat{i}_n(x, z, f, m) \hat{s}_n(x, z, f, m)$$

The gather in terms of angle of incidence is obtained by taking only the local harmonic decomposition of the incident field alone:

$$r_{inc}(x, z, \theta) = \sum_{n=-N}^{N} e^{jn\theta} \sum_{f,m} \overline{\hat{i}_n(x, z, f, m)} s(x, z, f, m)$$

Amplitude Preserved:

The angle gathers computed on the basis of the crosscorrelations are kinematic gathers where the amplitude of the events is not preserved. It is possible to obtain gathers with preserved amplitudes by computing normalization factors on the basis of various autocorrelations of the incident field. For example, for the gather in terms of opening angle, it is possible to compute the local harmonic decomposition of the reflectivity through:

$$\hat{r}_n(x, z) = \frac{(-1)^n \sum_{f,m} \overline{\hat{i}_n(x, z, f, m)} \hat{s}_n(x, z, f, m)}{\sum_{f,m} \overline{\hat{i}_n(x, z, f, m)} \hat{i}_n(x, z, f, m)}$$

Other Variant Implementations

The method described can be implemented with variants. The method is based on the synthesis of a filter effecting the transfer function $H = e^{-j\theta}$. The implementation described previously is based on the relation:

$$\theta = \arcsin \frac{ck_x}{\omega} \qquad (23)$$

which has the advantage of not depending on the dispersion relation and hence of being valid even in the presence of anisotropy. However, as a general rule, we have to compute the decomposition into wavefield angular components which obey a dispersion relation. This implies that other expressions for θ are possible. In the case of an isotropic medium, $$k_x = \frac{\omega}{c}\sin\theta, k_z = \frac{\omega}{c}\cos\theta \qquad (24)$$

which implies that we can write:

$$\theta = \arctan\frac{k_x}{k_z} \qquad (25)$$

The filter can therefore be written:

$$H(k_x, k_z) = e^{-j\theta} = \frac{k_z + jk_x}{\sqrt{k_z^2 + k_x^2}} \qquad (26)$$

The advantage of this expression is that the filter no longer depends on ω/c. It should on the other hand be synthesized as a two-dimensional filter h(x,z). Since the filter does not depend on the frequency, it may be applied after summation over all frequencies and all shots.

REFERENCES

Rickett, J. and Sava, P., 2001, Offset and angle domain common image gathers for shot profile migration: 71st Ann. Internat. Mtg., Soc. Expl. Geophys., Expanded Abstracts, 1115-1118.

Xie, X. B. and Wu, R. S., 2002, Extracting angle domain information from migrated wavefield: 72nd Ann. Internat. Mtg., Soc. Expl. Geophys., Expanded Abstracts, 1360-1363.

The invention claimed is:

1. A method of processing seismic data obtained from seismic sensors, the method comprising processing incident waves and reflected waves at various points on the surface of the ground so as to determine an angle reflectivity gather, characterized by the steps according to which:

for various points considered, as well as for various frequencies and various shots, a local harmonic decomposition of the incident wave and/or the reflected wave as a sum of angle components is/are computed by implementing a recurrent processing according to which a harmonic of rank n+1, n being a positive integer, is determined as a function of one or more harmonics of rank n or lower to which is applied at least one filtering which depends on at least one local parameter at a point P of a subsurface area below said various points, this local parameter being chosen from among the components of the wavevector, the frequency of the wavefield, the local velocity, the local anisotropy parameters or any combination of these various parameters, a local harmonic decomposition of the reflectivity is deduced therefrom for the various points considered and is summed frequency-wise and shot-wise, an angle gather of the reflectivity is deduced from the harmonic decomposition thus obtained after summation, wherein said summed harmonic components of the reflectivity for the various points or said obtained angle gather of the reflectivity are used to provide one or more images representing the characteristics of said subsurface area.

2. The method according to claim 1, characterized in that to determine a gather in terms of opening angle, the equation being derived is:

$$r_{ope}(x, z, \theta) = \sum_{n=-N}^{N} (-1)^n e^{jn\theta} \sum_{f,m} \overline{\hat{i}_n(x, z, f, m)} \hat{s}_n(x, z, f, m)$$

where $\hat{i}_n$ and $\hat{s}_n$ respectively designate the components of the local harmonic decomposition of the incident wave and of the reflected wave.

3. The method according to claim 1, characterized in that to determine a gather in terms of local angle of dip of the reflector, the equation being derived is:

$$r_{dip}(x, z, \theta) = \sum_{n=-N}^{N} (-1)^n e^{jn\theta} \sum_{f,m} \hat{i}_n(x, z, f, m) \hat{s}_n(x, z, f, m).$$

4. The method according to claim 1, characterized in that to determine a gather in terms of angle of incidence, the equation being derived is:

$$r_{inc}(x, z, \theta) = \sum_{n=-N}^{N} e^{jn\theta} \sum_{f,m} \overline{\hat{i}_n(x, z, f, m)} s(x, z, f, m).$$

5. The method according to claim 1, characterized in that the reflectivity is normalized as a function of the autocorrelation of the incident wave.

6. Method according to claim 2, characterized in that the reflectivity is normalized as a function of the autocorrelation of the incident wave.

7. Method according to claim 3, characterized in that the reflectivity is normalized as a function of the autocorrelation of the incident wave.

8. Method according to claim 4, characterized in that the reflectivity is normalized as a function of the autocorrelation of the incident wave.

9. A method of processing seismic data of a subsurface area recorded by seismic sensors, wherein said seismic data comprises incident waves and reflected waves of signals that have propagated through a subsurface area, said method comprising the steps of:

determining local harmonic components of one or more incident waves and/or one or more reflected waves for one or more points P of a subsurface area, wherein said determination is achieved by implementing a recurrent processing comprising:

determining a harmonic of rank n+1, n being a positive integer, as a function of one or more harmonics of rank n or lower to which at least one filtering is applied, wherein said at least one filtering depends on at least one local parameter at said one or more points P, this local parameter being chosen from among the components of the wavevector, the frequency of the wavefield, the local velocity, the local anisotropy parameters or any combination of these various parameter;

for the one or more points P considered, as well as for various frequencies and various shots recorded for said subsurface area, performing a local harmonic decomposition of the reflectivity for the one or more points P considered from said determined local harmonic components of the incident and/or reflected waves;

summing said determined harmonic components of the reflectivity for the one or more points P considered over one or more frequencies and one or more shots recorded for said subsurface area;

determining an angle gather of the reflectivity from the sum of the harmonic components of the reflectivity, wherein said sum of the harmonic components of the reflectivity or said obtained angle gather of reflectivity is used to provide one or more images representing the characteristics of said subsurface area.

10. The method of claim 9 wherein said angle gather of the reflectivity is used to verify the exactness of a velocity model used to migrate said seismic data.

11. The method of claim 9 wherein said harmonic components of the reflectivity is determined according to $$\hat{r}_n(x, z) = \frac{(-1)^n \sum_{f,m} \overline{\hat{i}_n(x, z, f, m)} \hat{s}_n(x, z, f, m)}{\sum_{f,m} \hat{i}_n(x, z, f, m) \hat{i}_n(x, z, f, m)}.$$

* * * * *